No. 12,304. REISSUED JAN. 17, 1905.

F. H. COTTRILL.

SIGNAL FOR ADDING MACHINES.

APPLICATION FILED NOV. 23, 1904.

Witnesses:
Geo. W. Young.

Inventor:
Frank H. Cottrill
By Livingston A. Thompson
Attorney.

THE NORRIS PETERS CO., PHOTO-LITHO., WASHINGTON, D. C.

No. 12,304. Reissued January 17, 1905.

UNITED STATES PATENT OFFICE.

FRANK H. COTTRILL, OF MILWAUKEE, WISCONSIN.

SIGNAL FOR ADDING-MACHINES.

SPECIFICATION forming part of Reissued Letters Patent No. 12,304, dated January 17, 1905.

Original No. 761,149, dated May 31, 1904. Application for reissue filed November 23, 1904. Serial No. 234,097.

*To all whom it may concern:*

Be it known that I, FRANK H. COTTRILL, a citizen of the United States, and a resident of Milwaukee, State of Wisconsin, have invented certain new and useful Improvements in Signals for Adding-Machines; and I do hereby declare that the following is a full, clear, and exact description thereof.

My invention has for its object to provide a visible signal upon the keyboard of an adding-machine, thereby showing the operator at a glance before he uses said machine if it is at zero or "clear." If not, the position of the signal will be changed, thereby showing the operator that the machine when last used was not cleared of an amount.

Said invention consists in certain peculiarities of construction and combination of parts to be fully set forth hereinafter with reference to the accompanying drawings and subsequently claimed.

Figure 3:
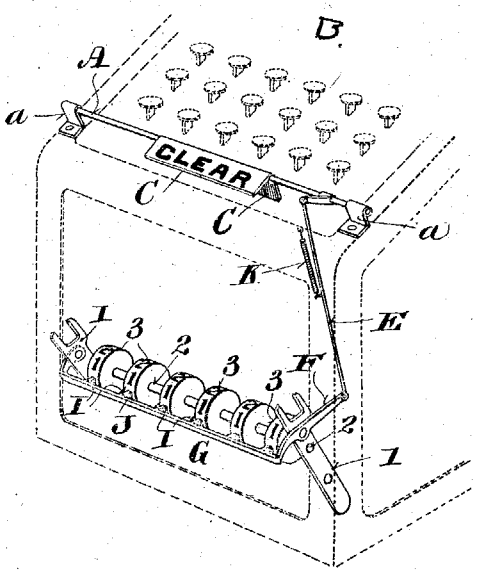
Figure 2:
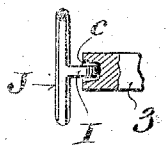
Figure 1:
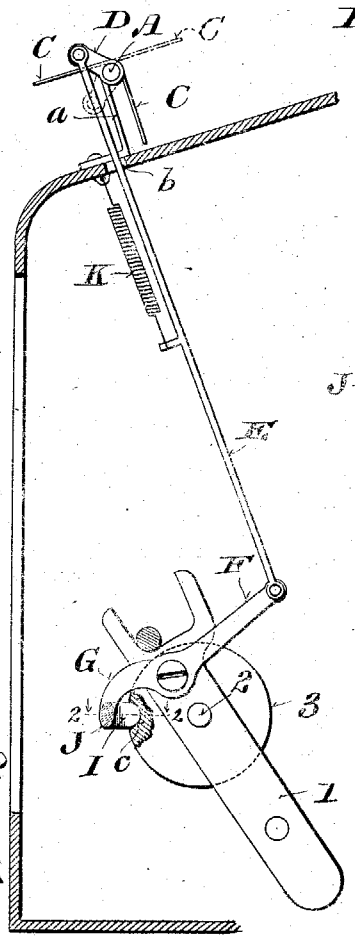

In the drawings, Figure 1 is a vertical section of a portion of an adding-machine with my improvement attached thereto. Fig. 2 is a detail section on line 2 2 of Fig. 1, and Fig. 3 is a perspective view of my device with a fragment of the adding-machine in dotted lines.

My device is more particularly applicable to that class of machines such as is shown in Patent No. 595,864, December 21, 1897, where a series of disks having numbers from "0" to "9" are arranged upon a shaft at the lower front portion of the machine, and when a key is depressed for a certain amount its corresponding disk will be revolved and will display the amount to the operator, while all other disks remain at zero. When this operation has been repeated as often as the operator desires and he has finished his work upon the machine, he may by pressing a certain key and pulling the handle return all the disks to zero or clear, and the machine is now ready for the next work.

In practice it is found that it frequently happens that an operator fails to clear the machine before using, and while the series of disks if examined individually would show this fact owing to their position it is seldom that the operator observes them, and consequently when the footing is made the amount would be plus the amount which had not been cleared previously.

Referring by letters to the drawings, A is a shaft pivoted in brackets *a* upon the front of the keyboard B of an adding-machine and directly in front of the operator. Secured to the shaft A is a right-angle signal-strip C, one wing of which is marked "Clear" and the other may be of any color to indicate danger or not clear.

An arm D is secured to the shaft A at one side of the machine, to which is attached a rod E, that passes through a slot *b* in the keyboard B, its other end being secured to an arm F of a yoke G, which is pivoted to hangers 1, the latter being a part of the present machine and forming no part of my invention and are for the purpose of carrying a shaft 2, upon which the disks 3 are mounted, and at their zero-point they are provided with semicircular pockets *c*, into which (when the disks are at normal or clear) rests a series of fingers I, that form part of the connecting-bar J of yoke G.

A spring K is connected to the lower side of the keyboard B and rod E and serves to hold the fingers into the pockets *c*, in which position the signal-strip C displays the word "Clear."

By the above description it is obvious that when the disks are at zero or clear the signal which is directly in front of the operator will show the word "Clear" when he looks at the keyboard; but if an amount has been left set up in the machine its corresponding disk will have moved from its normal or zero point, thereby forcing the finger I out of its pocket *c*, which will cause the yoke G to rock upon its pivot, and the rod E through its connections will rotate the signal-strip and display the danger or "not-clear" signal.

Having thus described my invention, what I claim as new, and desire to secure by Letters Patent, is—

1. In an adding-machine, a single signal located upon the face of the keyboard thereof, means connecting said signal with a series of independently-operative disks whereby when any one of the latter is actuated the position of said signal is changed, substantially as set forth.

2. In an adding-machine, a series of independently-operative disks, a yoke resting upon the latter and connected to a signal upon the keyboard, whereby when any one of the disks is actuated, the position of the signal is changed, substantially as set forth.

3. In an adding-machine, a signal located thereon adjacent to the keyboard, means connecting said signal and adding-machine mechanism whereby when said mechanism is at zero or clear said signal is held in one position, and when the aforesaid mechanism is actuated the position of the signal is changed, substantially as set forth.

FRANK H. COTTRILL.

In presence of—
M. GOLL,
A. L. DOELGER.